Feb. 28, 1950        G. H. SANBORN        2,499,167
METHOD OF FINISHING GEARS
Filed Feb. 8, 1945        2 Sheets-Sheet 1
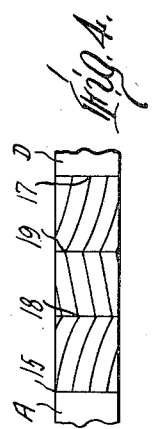
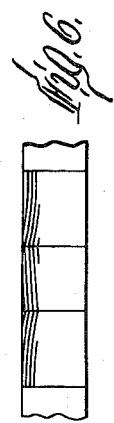
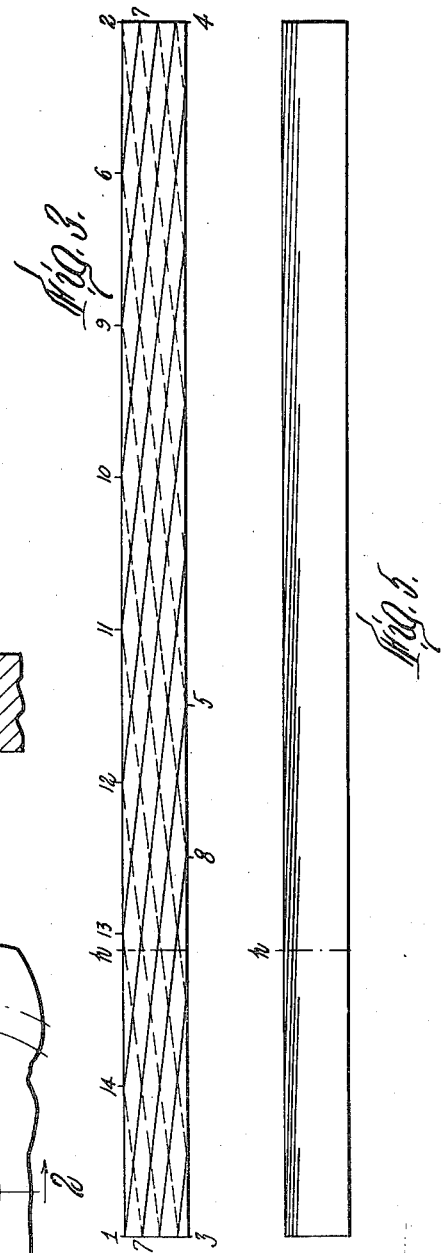
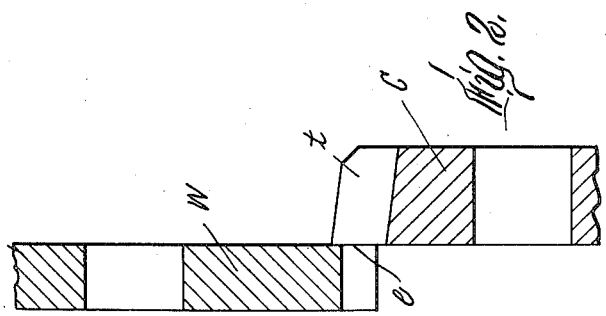
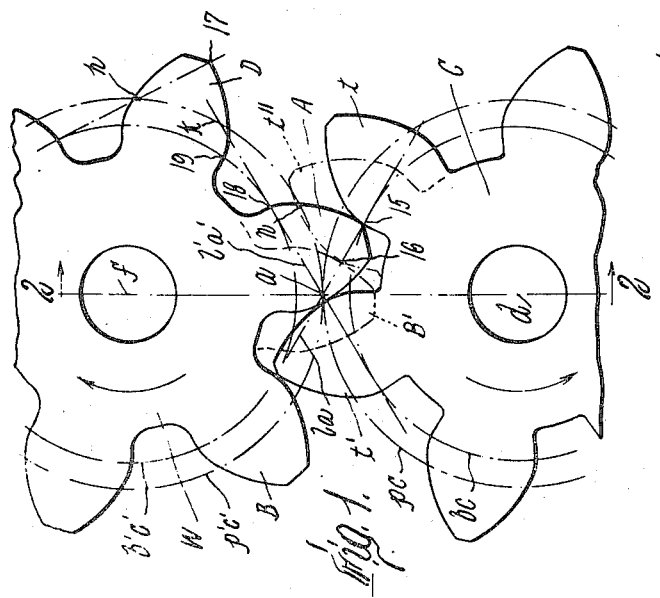
Inventor
George H. Sanborn

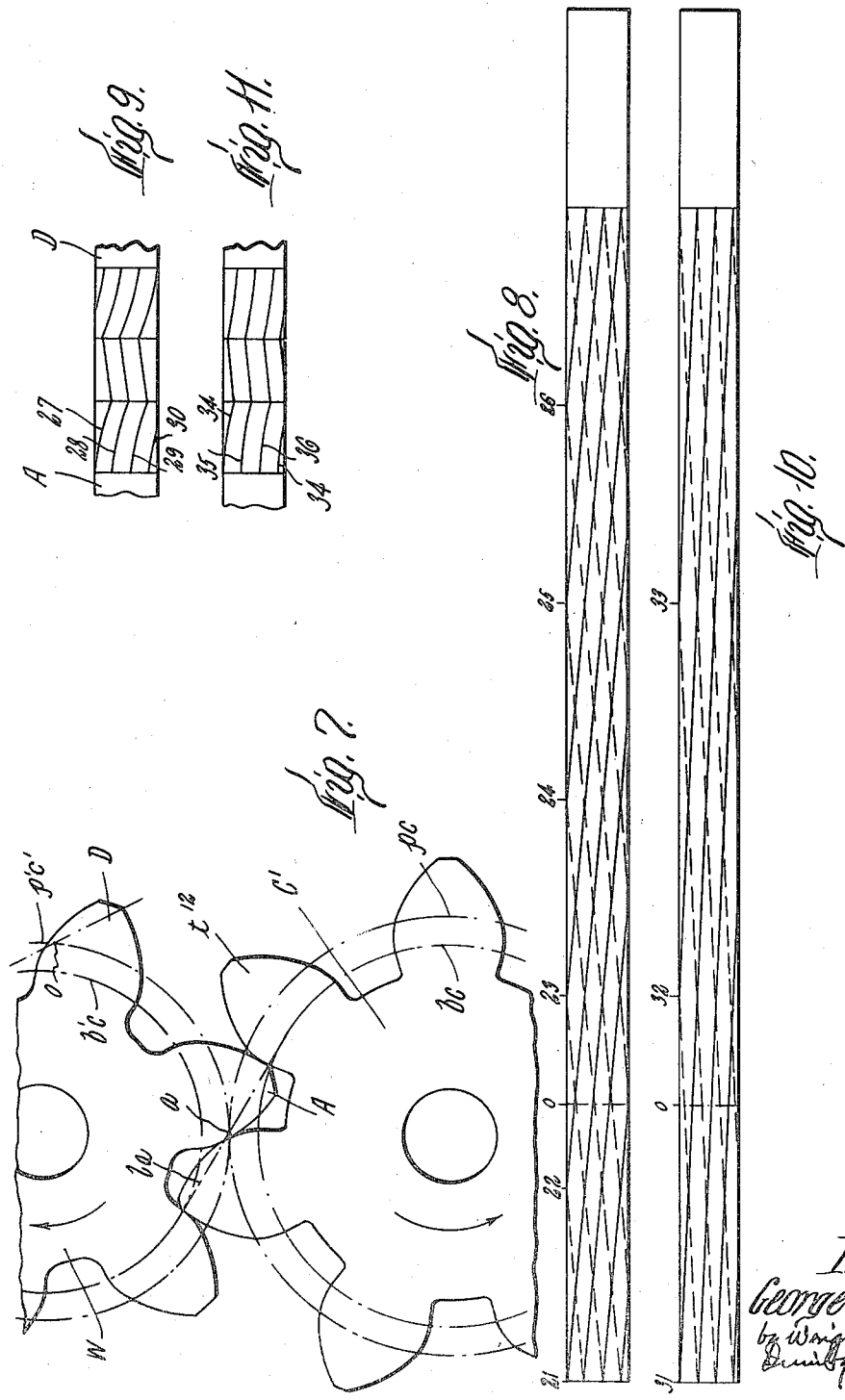

Patented Feb. 28, 1950

2,499,167

UNITED STATES PATENT OFFICE 2,499,167

METHOD OF FINISHING GEARS

George H. Sanborn, Royal Oak, Mich., assignor to The Fellows Gear Shaper Company, Springfield, Vt., a corporation of Vermont Application February 8, 1945, Serial No. 576,805

9 Claims. (Cl. 90—1.6)

The present invention relates to the finishing of cut gears and has for its general object to generate finished gear teeth with substantially absolute uniformity of pitch line width and spacing, and of face curvature, as to all of the teeth of any one gear; to produce a high quality of surface finish and smoothness comparable to that obtained by the action of shaving; and to accomplish these results by means of standard gear shaper cutters, that is, cutters having one edge only on each lateral face of their several teeth. As is well understood in this art, gear shaper cutters are characterized by teeth, having cutting edges at one end, and similar in form to gear teeth, except that they are tapered with diminishing thickness from the cutting end towards the opposite end, to limit their engagement with the work to the cutting edges only and to provide side clearance. The word "end" as used in this specification with reference to a cutter tooth or a gear tooth means the termination of the length of the tooth in the direction of the axis of the cutter or gear. The term "crest" in this connection means the outer radial limit or boundary in the circumference of the cutter or gear.

The gist of the invention consists in placing the cutter and work piece in mesh together, with their axes at the correct distance apart to bring the previously cut, but unfinished, gear teeth to correct width dimension, and rotating them at a relatively high speed, while effecting a relative axial reciprocation between the cutter and work at a slow speed. This procedure differs from the previously known method of gear shaping in that the speed of reciprocation is very slow in comparison with the speed of rotation, whereas in the prior gear shaping practice the reciprocation is relatively very rapid and usually comprehends many hundreds of strokes, or several thousands, in the course of a single rotation of the work. In contrast to this, the relative speed of the reciprocation according to the present invention may be in the order of from one or two cutting and return strokes in the course of one rotation of the work, to a single cutting stroke while the work makes several or many rotations. When the ratio of reciprocations to rotations is nearly one to one, a number of reciprocations and rotations are made in the course of finishing a single gear with a differential such that successive cutting strokes travel in different paths along the faces of the work gear teeth so that a feed is introduced whereby the cutting effect is distributed over the entire face area of the gear teeth.

The effect of this procedure is that the cutter acts on the work with a skiving or drawing cut instead of the planing cut which is characteristic of the standard gear shaping method, and the major component of the cutting movement is from root to crest of the gear teeth and vice versa rather than parallel to the axis, and whatever inaccuracies there may be, due to clearances necessary for lubrication of moving parts of the machine, yielding or springing of parts under pressure, etc., are averaged and equalized among all of the teeth of the gear. And a quality of surface finish substantially as good as that obtained by the complex shaving cutters having a multiplicity of cutting edges in their tooth faces is here obtained by the operation of single edged gear shaper cutters, and more quickly because a deeper cut can be taken by the gear shaper cutter than by the shaving cutter.

The principles and details of the invention are further and more fully explained in the following specification with reference to illustrative drawings and diagrams.

In the drawings:

Fig. 1 is a plan view showing a gear shaper and a gear having the same number of teeth in relation to one another for finishing the gear in accordance with the present invention;

Fig. 2 is a cross section of the cutter and gear one the line 2—2 of Fig. 1;

Fig. 3 is a diagram showing a development of the pitch cylinder of the gear with lines indicating the progressive locations thereon of the tangent point of the pitch circle of the cutter in the plane of the cutting edges when eight cutting and return strokes are made during seven rotations of the cutter and gear;

Fig. 4 is an elevation of the adjacent sides and intermediate root circumference of two teeth of the gear showing the nature of the lines or marks produced by the cutting edge of the cutter when the ratio of cutting reciprocation to rotation is the same as that represented in Fig. 3;

Fig. 5 is a diagram of the same character as in Fig. 4 showing the relation of the pitch circle of the cutter to the pitch cylinder of the work gear when the ratio of reciprocation to rotation is the same, but the strokes are shorter than the face width of the gear;

Fig. 6 is a view similar to Fig. 4 showing the lines made by the cutting edge of the cutter on the bounding surfaces of a tooth space of the gear in the conditions shown in Fig. 5;

Fig. 7 is a view similar to Fig. 1 but differing therefrom in that the cutter has a larger number of teeth than the gear;

Fig. 8 is a diagram similar to Fig. 3 showing the progression of the pitch circle of the cutter shown in Fig. 7 on the pitch cylinder of the gear when the ratio of reciprocation to rotation of the work is six to seven;

Fig. 9 is an elevation similar to Figs. 4 and 6 showing the character of the cutter marks made under the conditions represented in Fig. 8;

Fig. 10 is a diagram similar to Fig. 8 showing the relative pitch circle displacement of the cutter and work gear shown in Fig. 7 when the ratio of cutting reciprocation to rotation of the work is 3 to 7;

Fig. 11 is a view similar to Figs. 4, 6 and 9 showing the nature of the cuts made under the conditions represented by the diagram of Fig. 10.

In this specification the word "reciprocation" is defined as meaning the forward and back relative axial travel between the cutter and work composed of a cutting stroke and a return stroke. Thus, for instance, when it is said that the cutter makes eight reciprocations during seven rotations of the work, it means that eight cutting strokes and eight return strokes are completed in that time. Each cutting stroke then takes place during seven sixteenths of one rotation of the work.

Referring to Figs. 1 and 2, a gear shaper cutter C is shown in operative relation to a work gear W which has been cut to an approximation of finished form and dimensions but with an excess of metal on the faces and flanks of its teeth left to be removed by a finishing operation. The cutter is of conventional or standard character well known to those skilled in the art having teeth with cutting edges at one end, the outlines of which are those of gear teeth conjugate to the gears to be finished. The sides and outer extremities of the teeth are relieved so as to limit contact with the work to the cutting edges exclusively. A part of the cutting edge of the cutter tooth $t$ is shown at $e$ in Fig. 2, that tooth being represented as in elevation at the right hand side of the line 2—2 in Fig. 1. In performing the method, either the cutter or the gear is reciprocated relative to the other in the direction of the axis of the cutter, and both are rotated simultaneously at a speed ratio proportional to their respective numbers of teeth. For the purpose of the present explanation it is assumed that the cutter is the element that is so reciprocated; but that is not a limiting factor, since the gear may be reciprocated or both may be simultaneously reciprocated each oppositely to the other. The rotation is imparted by correlated positive driving means to both the cutter and the gear; that is, neither drives the other by the lateral pressure of intermeshing teeth, but both are rotated by external force separately applied to each. In this illustration the cutter and gear have equal numbers of teeth and their axes are parallel and spaced apart by the distance which affords full mesh between the cutter and gear in the finished state of the latter; but these are conditions which may be varied, as later appears. Then the pitch circle $pc$ of the cutter is equal in diameter to the pitch circle $p'c'$ of the work gear, these circles being tangent at the point $a$ (the pitch point) where they cross the line of centers $d—f$. Cutting contact takes place along the lines of action $la$ and $l'a'$, which pass through the pitch point $a$ at the prescribed pressure angle, which may be of any value within the range suitable for gears. Since, in this illustration, the gear to be finished is an involute gear, the lines of action are straight lines, the cutting edges are involute curves generated from the base circle $bc$ of the cutter and the curves they generate are involutes of the base circle $b'c'$ of the work gear, such base circles being tangent to the lines of action and centered on the axes $d$ and $f$ respectively.

The basic new step of the invention, as previously stated, consists in imparting a relatively rapid rotation to the work and cutter in proportion to the rate of reciprocation. The effects of this new principle are illustrated diagrammatically in Fig. 3. Here the rectangle 1, 2, 3, 4 represents the developed pitch cylinder of the gear of which the dimension 1—2 is the circumference and the dimension 1—3 is the face width (axial length) of the gear. The inclined lines represent successive positions of the point of tangency between the pitch circle of the cutting edges of the cutter and the pitch cylinder of the gear as they are simultaneously rotated and relatively reciprocated. Assuming that a cutting stroke commences when the cutter pitch circle is tangent to said pitch cylinder at the point 1, and that the cutter makes eight reciprocations while the gear turns through seven rotations, then the stroke ends at the point 5 when the work has turned through seven sixteenths of a rotation. On the further assumptions that reversals are made without any overrunning, that is, when the active end of the cutter coincides with the end face of the gear, and that the speed of reciprocation is uniform without pause at reversals, then the tangent point on the return stroke progresses along the broken line 5—6 and ends when the gear has completed seven eighths of a rotation. The second cutting stroke proceeds along the line 6—7—8, the next return stroke along the broken line 8—9, and so on; the following cutting strokes commencing at the points 9, 10, 11, 12, 13 and 14 on the pitch circumference of the gear until the cycle is completed upon return of the gear and cutter to the starting point.

In actual practice the cutter usually passes slightly beyond the work on each stroke and is retarded and accelerated at reversals, wherefore the progressive positions may not follow truly helical lines of uniform lead and the lines representing strokes in opposite directions may not meet at the faces of the gear; but the principle and effect are the same as that indicated by the diagram.

A differential between the rotation and timing of the reciprocations is provided in order to obtain an axial feeding of the cutting effect. It is obvious that if the work were rotated through exactly one rotation during one reciprocation of the cutter, the cutter would follow the same path along the face of the work on each cutting stroke, since each such stroke would start at the same point on the circumference of the gear. Also if the gear were rotated two or three whole revolutions in the time of one reciprocation, the cutter would soon return to the same path on the work.

The effect of the differential above described may be considered also as a commencement of successive strokes at different points along the line of action. Thus, for instance, and with reference to Figs. 1 and 2, the cutting stroke of the cutter tooth $t$ with respect to the gear tooth A is shown as commencing at the extremity of tooth A when the latter reaches the line of action at the point 15. On the assumptions previously stated, the return stroke is completed and the cutter ready to make its second stroke when the work has turned through seven eighths of a revolution. The tooth B of the gear has then advanced to a position approximating that represented by dotted lines and designated B', and the tooth $t'$ has advanced to a position approximating the dotted line position designated $t^{11}$, these teeth when in those positions being in cutting engagement at the point 16 on the line of action. Other cutting strokes are commenced at other points along the line of action.

The nature of the cuts made when the speed ratios are as above described is illustrated in Fig. 4, which shows in elevation the adjacent sides of the teeth A and D, and the bottom of the space between them. The cutting action in the space between these two teeth begins at the point 15 and ends when the extremity 17 of tooth D separates from the cutter tooth $t$. During this action a given point on the gear rotates through the angle between the points $a$ and $h$ on the pitch circle $p'$ $c'$. The advancing edge of tooth $t$ acts on the trailing side of the tooth A until it reaches the base circle $b'$ $c'$ of the gear at the point 18, the point $k$ on the pitch circle $p'$ $c'$ having then arrived at the pitch point $a$. But before the cutter and gear have rotated thus far, and when the point $n$ on the pitch circle $p'$ $c'$ has reached the pitch point $a$, the extremity of the trailing edge of the cutter tooth $t$ engages the tooth D at the point 19 on the base circle $b'$ $c'$. The part of the cutter tooth which crosses the base circle $b'$ $c'$ then cuts the flanks of the teeth D and A in the reverse direction from the point 19 to the point 18 while the arc of the gear pitch circle from $n$ to $k$ is passing the pitch point, and during the passage of the arc from $n$ to $h$ the trailing edge of the tooth $t$ cuts the advancing face of tooth D from the point 19 to the point 17. Thus in the course of the cycle previously described with respect to Fig. 3, the first stroke causes cuts to be made as indicated by the line 15—18—19—17 in Fig. 4, and subsequent strokes cause similar cuts to be made as indicated by the lines similar to and beneath the one last designated in Fig. 4. These cuts in the faces of the gear teeth extend generally in the direction from crest to root and root to crest; that is, they have a relatively large component of travel in the rotational plane of the gear and a relatively short component in the axial direction. This is a radical departure from the effects of the shaping method of gear generation as heretofore practised, wherein the total length of each cut is nearly equidistant at all points from the axis of the gear and the component in the plane of rotation is negligible.

It should be remembered that in actual operation the cutter teeth do not make fine lines in the work, as diagrammatically indicated in Fig. 4 and other similar figures of these drawings, but their cuts are bands or zones of appreciable width (greater or less according to the depth of cut and other variable conditions) which merge to produce the desired finished surface in consequence of the feeding procedure described. This is so with all of the various ways in which the invention may be practised.

The feeding effect may be obtained also by altering the starting points of successive strokes. That is, instead of causing all of the cutting strokes to begin at the same location with respect to the end face of the gear, successive strokes may begin and end at different locations along the path of reciprocating movement. This causes an increment of relative movement between the gear and tool which is equivalent to the increment of angular movement previously described. It may be employed with or without including an odd fractional ratio in the relative rotation of cutter and work piece. In any case there is such an increment of movement, either in rotation or reciprocation, that different strokes start at different points on the pitch line of the gear in the course of a cycle of operations.

The rotational component of cutting action may be brought nearer to the plane of rotation than as indicated in Fig. 4 by either relatively increasing the speed of rotation or decreasing the speed of the reciprocating motion or shortening the length of strokes. Figs. 5 and 6 show the effect of shortening the stroke to less than the full face width of the gear without changing the ratio of rotations to reciprocations. The inclined lines shown in these figures have the same significance as those in Figs. 3 and 4, respectively, and the ratio of eight reciprocations to seven rotations in each cycle is the same. But the length of stroke is only a fraction of the face width of the gear, and the cycle is repeated one or more times with shifting of the locus of reciprocations relative to the gear, until the entire length of the gear faces have been acted upon.

It is not essential that the numbers of teeth of the cutter and work be equal. Fig. 7 shows an arrangement in which the cutter $C'$ has seven teeth and the work piece six; and Figs. 8 and 9 show the relative motions and nature of the cuts when the cutter makes one reciprocation in the course of one rotation and the work makes one and one-sixth rotations in the same length of time. The pitch and base circles of the cutter and gear, and the lines of action are designated by the same reference characters as in Fig. 1. The point $a$ is the pitch point, and the point $o$ is the point on the pitch circle of the gear which arrives at the pitch point when the tooth D of the gear passes out of engagement with the cutter tooth $t^{12}$. The points 21, 22, 23, 24, 25 and 26 represent the starting points on the pitch cylinder of the gear of the several reciprocations of the cycle, and the inclined lines leading to and from those points represent the progression on the pitch cylinder of the gear of the pitch circle of the cutter during these several strokes. The broken lines 27, 28, 29 and 30 represent the cuts on the bounding surfaces of the space between the teeth A and D.

Figs. 10 and 11 show in like manner the relative movements and cutting effect when the cutter $C'$ makes one reciprocation in the course of two rotations and the work gear makes two and one-third rotations in the same time. The points 31, 32 and 33 designate the starting points, on the pitch circle of the gear, of the three reciprocations which take place during the cycle. In Fig. 11 the broken lines 34, 35 and 36 represent the cuts made during this cycle in the space between the teeth A and D.

In all of the preceding illustrations the face width (axial length) of the gear is the same.

The relative motion of the cutter with respect to the work and its cutting effect are substantially the same in all of the foregoing illustrations. They are the same in principle also with gears of any diameter, larger or smaller than the cutter, and of any length in the axial direction (face width) provided only that a correspondingly large (or larger) ratio of angular speed of the gear to speed of cutting reciprocation is maintained. The critical factor of the invention is that this ratio be of a large enough value to make the component of cutting travel in the plane of rotation of the work larger than the component in the direction of the axis of the work. It is generally important also that there be a differential between the rate of rotation of the work and the rate of reciprocation such that successive cutting strokes start at different points on the pitch circle of the gear or at different points on the lines of action; in order that there will be an axial feed of the cutting action along the gear teeth with a sufficiently close placement of successive cuts to make a smooth finished surface. But this is not a prime essential, for it is possible, by rotating the work gear sufficiently fast and making the cutting travel sufficiently slow, to cause the cuts made during successive rotations to be located close enough together to produce the desired effect.

This method is applicable for finishing previously cut gears of which the teeth are wider than prescribed finished dimensions. According to the amount of excess stock left in the initial cutting, the finishing may be performed in one or more cycles. Where too much stock is left for finishing in one cycle, a depth feeding step is performed between successive cycles by altering the center distance between cutter and work gear.

The finish produced by standard gear shaper cutters operated according to this method is comparable to that obtained by the method of gear shaving in which a gear-like tool having many cutting edges in the faces of its teeth is employed. It is less expensive than shaving, however, in that it requires less time to remove a given amount of stock because a heavier cut can be taken, and the expense of making cutters with a single cutting edge on the several teeth is less than that of making shaving cutters with a multiplicity of edges in each tooth face.

For finishing helical gears, whether external or internal, in accordance with this method, the axes of cutter and work may be relatively inclined at an angle corresponding to the helix angle of the gear and the procedure carried on otherwise exactly as hereinbefore described, or a helical cutter may be used and operated with its axis parallel to that of the work and rotated with a speed differential between its cutting and return strokes sufficient to compensate for the increment of angular movement necessitated by the helical arrangement of the gear teeth.

In making the return strokes of the reciprocations, the cutter and work are relatively moved apart a distance sufficient to avoid rubbing of the cutter teeth on the work.

What I claim and desire to secure by Letters Patent is:

1. The gear finishing method which consists in placing in mesh with, and cutting relation to, a gear to be finished, a cutter having peripheral teeth similar to the teeth of a gear conjugate to the gear to be finished, the said cutter teeth each having lateral faces at opposite sides, both of which intersect the end face at angles smaller than right angles and forming cutting edges at such intersections, the axes of the gear and cutter being parallel, rotating the gear and cutter about their respective axes in relatively opposite directions of rotation at speeds inversely proportional to their respective numbers of teeth by external force simultaneously applied to both, and effecting a relative axial reciprocation between the cutter and gear at a ratio within the range of from one half to two and one half rotations of the work to one reciprocation.

2. The gear finishing method which comprises meshing a gear to be finished with a gear shaper cutter so that contact between the gear and cutter is limited to cutting edges at the axial extremities of the cutter teeth, simultaneously rotating the cutter and gear at speeds inversely proportional to their respective numbers of teeth, and simultaneously effecting a relative reciprocation between the cutter and gear in the direction of the axis of the cutter at a linear speed less than the linear pitch line speed of the cutter and gear.

3. The gear finishing method set forth in claim 2, which comprises further introducing an increment of relative movement between the gear and cutter such that, with respect to any single plane perpendicular to the axis of the gear, the relative reciprocations will start at different points on the pitch line of the gear in the course of a plurality of reciprocations.

4. The gear finishing method according to claim 2, in which the cutter and gear are rotated by external force applied to each independently of the other.

5. The gear finishing method according to claim 4, in which the reversals of some of the relative reciprocating movements are effected while the cutter and gear are withdrawn axially and clear of one another.

6. The gear finishing method according to claim 2, in which the cutter and gear are rotated by external force applied to each independently and are held in engagement during the cutting strokes of their relative reciprocation and are held apart sufficiently to avoid rubbing contact during the return strokes of such reciprocation.

7. The gear finishing method which comprises meshing a peripherally dentate work piece with a conjugate gear shaped cutting tool, rotating the cutter and work piece in a manner similar to that of two gears running in mesh and effecting relative reciprocations between the cutter and work piece in the direction of the axis of rotation of the cutter, with such a large ratio of rotation to reciprocation that a skiving or drawing cut rather than a planing cut is made, and introducing a differential between the rotation and timing of the reciprocations, whereby in any single plane perpendicular to the axis of rotation of the work piece, the relative reciprocations will start at different points on the pitch line of the work piece in the course of a plurality of reciprocations.

8. The gear finishing method according to claim 7, in which the rotation of the cutter and work piece is effected by external force applied to each independently of the other.

9. The gear finishing method according to claim 8, in which the cutter and work piece are held in engagement during the cutting strokes of their relative reciprocation and are held apart sufficiently to avoid rubbing contact during the return strokes of such reciprocation.

GEORGE H. SANBORN.

REFERENCES CITED

The following references are of record in the file of this patent:

UNITED STATES PATENTS

| Number | Name | Date |
|---|---|---|
| 579,708 | Fellows | Mar. 30, 1897 |
| 1,175,066 | Lees | Mar. 14, 1916 |
| 1,642,179 | Schurr | Sept. 13, 1927 |
| 2,137,146 | Simmons | Nov. 15, 1938 |
| 2,270,422 | Drummond | Jan. 20, 1942 |